United States Patent
Charny et al.

(10) Patent No.: US 7,417,999 B1
(45) Date of Patent: Aug. 26, 2008

(54) PRIORITY PROPAGATION IN A MULTI-LEVEL SCHEDULING HIERARCHY

(75) Inventors: Anna Charny, Sudbury, MA (US); Christopher Kappler, Waltham, MA (US); Robert Olsen, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 736 days.

(21) Appl. No.: 10/758,547

(22) Filed: Jan. 14, 2004

(51) Int. Cl.
  *H04L 12/66* (2006.01)
(52) U.S. Cl. .............. 370/408; 370/395.42; 370/395.43
(58) Field of Classification Search .............. 370/395.4, 370/395.42, 412, 408, 395.43
  See application file for complete search history.

(56) References Cited

U.S. PATENT DOCUMENTS

| | | | |
|---|---|---|---|
| 5,864,540 | A | 1/1999 | Bonomi et al. |
| 6,130,878 | A | 10/2000 | Charny |
| 6,408,005 | B1 | 6/2002 | Fan et al. |
| 6,412,000 | B1 | 6/2002 | Riddle et al. |
| 6,560,230 | B1 * | 5/2003 | Li et al. ............... 370/395.42 |
| 6,691,312 | B1 | 2/2004 | Sen et al. |
| 6,836,475 | B2 | 12/2004 | Chaskar et al. |
| 7,006,513 | B1 * | 2/2006 | Ali et al. ............... 370/414 |
| 7,283,472 | B2 * | 10/2007 | Widmer et al. ........... 370/230.1 |
| 2003/0179703 | A1 * | 9/2003 | Levy et al. ............... 370/230 |
| 2005/0152374 | A1 | 7/2005 | Cohen et al. |
| 2006/0029079 | A1 | 2/2006 | Cohen et al. |
| 2006/0029080 | A1 | 2/2006 | Kappler et al. |
| 2006/0153243 | A1 | 7/2006 | Shoham et al. |

OTHER PUBLICATIONS

Bennett et al.; "Hierarical Packet Fair Queing Algortithms", Oct. 1997; IEEE/ACM Transaction on Networking, vol. 5 No. 5 pp. 675-689.*
Jon C.R. Bennett et al., "Hierarchical Packet Fair Queuing Algorithms", IEEE ACM Transactions on Networking, 5(5), pp. 675-689, Oct. 1997.
T. Cormen et al., "Introduction to Algorithms", The MIT Press, Chapter 9, 1990.
J.D. Foley et al., "Computer Graphics: Principles and Practice", Addison-Wesley, 1990, pp. 74-80.
S.J. Golestani, "A Self-Clocked Fair Queuing Scheme for Broadband Applications", Proc. INFOCOM'94, pp. 636-646, Apr. 1994.
P. Goyal et al., "Start-time fair queuing: a schedulings algorithm for integrated services packet switching networks", Proc. Sigcomm, 1996.

(Continued)

*Primary Examiner*—Ricky Q. Ngo
*Assistant Examiner*—DeWanda Samuel
(74) *Attorney, Agent, or Firm*—Cindy Kaplan

(57) ABSTRACT

Priority propagation is achieved in the context of a rate-based scheduling hierarchy. Priority traffic is not delayed by non-priority traffic by more than the duration required for transmission of the maximum packet length at the physical interface speed. Multiple sibling priority levels are supported. To achieve these objectives, the scheduling hierarchy tree is divided into sub-trees corresponding to non-priority traffic and the different levels of priority. At each scheduling decision, a packet is selected from the highest priority non-empty sub-tree. Scheduling decisions within each sub-tree exploit the usual rate-based scheduling method but without priority propagation. When a packet from a priority sub-tree is chosen, scheduling state in the non-priority sub-tree is updated.

19 Claims, 5 Drawing Sheets

OTHER PUBLICATIONS

Chris Kappler et al., "HQF Implementation Based on Sorting Trees (HIST)", Cisco Systems, Doc. No. EDCS-273780—rev 3.9, pp. 1-123.

S. Keshav et al., "An Engineering Approach to Computer Networking", Addison-Wesley, Chapter 9, 1997.

J-Y Leboudec et al., "A Short Tutorial On Network Calculus I: Fundamental Bounds in Communication Networks", Proceedings ISCAS2000, Geneva, Switzerland, May 2000.

W. Leland et al., "On the Self-Similar Nature of Ethernet Traffic", SIGCOMM'93, pp. 183-193, 1993.

A.K.J. Parekh, "A Generalized Processor Sharing Approach to Flow Control in Integrated Services Networks", Ph.D. thesis, Massachusetts Institute of Technology, Feb. 1992.

M. Roughan et al., "Measuring long-range dependence under changing traffic conditions", in Proc. IEEE INFOCOM'99, New York, Mar. 1999, pp. 338-341.

Ion Stoica et al., "Earliest Eligible Virtual Deadline First: A Flexible and Accurate Mechanism for Proportional Share Resource Allocation", Department of Computer Science, Old Dominion University, Norfolk, Virginia, TR-95-22, Jan. 26, 1996, pp. 1-37.

Ion Stoica et al., "An Efficient Packet Service Algorithm for High Speed ATM Switches", Department of Computer Science, Old Dominion University, Norfolk, Virginia, pp. 1-24.

K. Thompson et al., "Wide-Area Internet Traffic Patterns and Characteristics", IEEE/ACM Transactions on Networking, pp. 10-23, Nov. 1997.

T. Tuan et al., "Multiple Time Scale Congestion Control for Self-Similar Network Traffic", Performance Evaluation, 36:359-386, 1999.

Bennett et al., "Hierarchical Packet Fair Queuing Algorithms," IEEE/ACM Transactions on Networking (TON), vol. 5, Issue 5, Oct. 1997, pp. 675-689.

Hou et al., "Service Disciplines for Guaranteed Performance Service,"Fourth Int'l Workshop on Real-Time Computing Systems and Applications,Oct. 27-29, 1997 ,pp. 244-250, Taipei.

Hagai et al., "Multiple Priority, Per Flow, Dual GCRA Rate Controller for ATM Switches," The 21st IEEE Conv., Apr. 11-12, 2000, pp. 479-482, Tel-Aviv, Israel.

Kim et al., "Three-level Traffic Shaper and its Application to Source Clock Frequency Recovery for VBR Services in ATM Networks," IEEE/ACM vol. 3, Iss.4, Aug. 1995, pp. 450-458.

Dixit et al., "Traffic Descriptor Mapping and Traffic Control for Frame Relay Over ATM Netowrk," IEEE/ACM TON, vol. 6, Issue 1, Feb. 1998, pp. 56-70.

Bennett et al., "WF2Q: Worst-case Fair Weighted Fair Queuing," INFOCOM '96 Fifteenth Annual Joint Conference of the IEEE, Mar. 24-28, 1996, vol. 1, pp. 120-128.

Bennett et al., "High-Speed, Scalable, and Accurate Implementation of Fair Queuing Algorithms in ATM Networks," ICNP '97,http://www-2.cs.cmu.edu/~hzhang/papers/ICNP97.pdf, 1997.

* cited by examiner

PRIORITY PROPAGATION IN A MULTI-LEVEL SCHEDULING HIERARCHY

STATEMENT OF RELATED APPLICATIONS

The present invention is related to the subject matter of U.S. patent application Ser. No. 10/357,878, entitled "Scheduling System and Method for Multi-Level Class Hierarchy," filed on Feb. 4, 2003, the contents of which are herein incorporated by reference in their entirety for all purposes.

BACKGROUND OF THE INVENTION

The present invention relates generally to communication networks and more specifically to systems and methods for rate-based scheduling.

High speed networks are designed to carry services with a wide range of quality-of-service (QoS) requirements. It is useful to define a hierarchy of traffic classes over which QoS requirements may be configured. FIG. 1 depicts an example of such a hierarchy. There are three levels. The bottom level or root is a node 102 defining a single physical interface over which traffic will be transmitted. The next level of hierarchy shows three logical interfaces 104, 106, 108. Logical interfaces may correspond to, e.g., virtual LANs (VLANs). A third level of hierarchy consists of classes. Here logical interface 104 has associated classes 110 and 112. Logical interface 106 has classes 114, 116, and 118. Logical interface 108 has associated classes 120 and 122. Each class has may represent, for example, a different customer.

Thus, all of the classes, logical interfaces, and physical interfaces are represented by nodes in a tree structure. The nodes corresponding to the classes are leaf nodes, i.e., they are furthest from the root node in the hierarchy. When packets arrive they are placed in a queue associated with a leaf node.

Each node in this hierarchy typically has a configured minimum rate, maximum rate, and excess bandwidth sharing weight. Each node is expected to be served by its parent node at least at its configured minimum service rate and up to its maximum configured rate. The excess service that can be given to a node above and beyond its minimum rate is proportional to its specified excess bandwidth sharing weight relative to the weights of its active non-empty peers that are simultaneously vying for excess service.

Furthermore, individual nodes can be configured as priority nodes. In FIG. 1, priority nodes are drawn with dashed lines. Priority nodes have higher scheduling preference than their siblings regardless of the other scheduling criteria. For example, voice traffic may be assigned to a priority class. The class hierarchies now being discussed are desired to have the property of priority propagation. This means that a priority indication can be passed on a per-packet basis from a node to its parent. Priority nodes do not typically have minimum and maximum rates or excess sharing weights but may have priority rates to be used in allocating transmission resources among sibling priority nodes.

The tree structure of FIG. 1 also represents a scheduling hierarchy that corresponds to the class hierarchy. The goal of the scheduling hierarchy is to determine the sequence of packet transmissions in such a way as to insure the satisfaction of the rate and priority settings of each node in the class hierarchy. Conceptually, the scheduling hierarchy performs as follows. The root node in the class hierarchy runs a one-layer scheduler to choose one of its children nodes. A chosen child in turn, runs its own one-layer scheduler that chooses one of its own children. This process continues until a "leaf" of the class hierarchy is reached.

Attributes of the children, such as the guaranteed rates and priorities of the children are actually stored in and managed by the parent's scheduler. From the perspective of the parent, the children nodes are schedule entries in the local scheduler.

In a representative implementation, the behavioral model of a scheduling node is as follows:

1) If at least one of the priority schedule entries is not empty, one of the priority entries must be chosen.

2) If all priority schedule entries are empty, then choose one of the schedule entries whose minimum rate has not yet been satisfied.

3) If all schedule entries with non-zero minimum rates have currently reached or exceeded their minimum rate, choose a schedule entry whose maximum rate has not yet been satisfied.

In a non-pipelined implementation, for each physical interface packet transmission opportunity, a scheduling decision is made that involves selecting a node from the lowest level of the hierarchy. A single scheduling decision involves traversal of scheduling nodes along a particular path through the tree. The choice of the branch to follow at each scheduling node is determined by a scheduling decision at each node: the next (child) scheduling node in the traversal is the one corresponding to the schedule entry chosen at the previous scheduling node. The result of this tree traversal is to select a packet from a queue associated with one of the leaf nodes.

Alternatively, a packet pipeline model can be used. The physical interface scheduling decision is made from among packet handles (pointers to queued packets) that have propagated to nodes at the level of hierarchy adjacent to the root. The root node picks a packet handle based on its scheduling criteria. The node that stored this packet handle then replaces it with a packet handle stored by one of its children, making a selection based on its own scheduling criteria. In this way, packet handles propagate downward from leaf nodes to the root.

Problems arise in applying the scheduling hierarchy to handling priority traffic. It is desirable to mandate the property referred to above as priority propagation so that priority traffic experiences low latency.

For example, when the root node arbitrates among its children, it may be that none of these children are configured with priority, but some of the descendants of these children are configured with priority and are non-empty. It is desirable therefore that the root chooses a child with non-empty priority descendant(s). In a purely rate-based scheduler, such functionality is unavailable, as each node arbitrates among its own children only based on the children's state and does not have any awareness of the existence of priority descendants beyond its own child layer. Hence, the scheduler may choose a branch of the tree with no priority traffic even though some other branch of the tree may contain non-empty priority nodes. This will cause extra undesirable delay for priority traffic.

Additionally, inaccuracies in the rate-based scheduler may further increase the latency of priority traffic and further exacerbate the inability to provide the necessary low latency to priority traffic. One typical scenario where the prior art rate-based schedulers fall short arises when a node with an active priority descendent must wait for a large number of siblings to be scheduled ahead of this node even if the other siblings have no priority traffic. If packet pipelining is used, the pipeline delay further contributes to undesired latency imposed on priority traffic. It would be desirable to have a scheduler that meets the following criteria:

1) Priority traffic is not delayed by competing non-priority traffic by more than the time duration needed to transmit one maximum length packet at the speed of the physical interface.

2) Multiple sibling priority levels are supported.

3) Different priority streams are scheduled in proportion to their priority rates to minimize per-flow jitter.

4) The excess-rate service that each entry receives over its minimum rate is shared according to the specified excess sharing weight.

SUMMARY OF THE INVENTION

Embodiments of the present invention achieve priority propagation in the context of a rate-based scheduling hierarchy. Priority traffic is not delayed by non-priority traffic by more than the duration required for transmission of the maximum packet length at the physical interface speed. Multiple sibling priority levels are supported. To achieve these objectives, the scheduling hierarchy tree is divided into sub-trees corresponding to non-priority traffic and the different levels of priority. At each scheduling decision, a packet is selected from the highest priority non-empty sub-tree. Scheduling decisions within each sub-tree exploit the usual rate-based scheduling method but without priority propagation. When a packet from a priority sub-tree is chosen, scheduling state in the non-priority sub-tree is updated.

One aspect of the present invention provides a scheduling method for a multi-level class hierarchy wherein classes are represented as nodes. The method includes: selecting non-priority nodes of the unified tree to establish a non-priority sub-tree, selecting priority nodes of the unified tree to establish one or more priority sub-trees corresponding to one or more priority levels, if and only if queues of nodes of the priority sub-trees are empty, applying a first scheduling algorithm to the non-priority sub-tree to select a packet for transmission, and, if any of the one or more priority sub-trees are non-empty, selecting a priority packet from the one or more priority sub-trees for transmission.

Further understanding of the nature and advantages of the inventions herein may be realized by reference to the remaining portions of the specification and the attached drawings.

DESCRIPTION OF SPECIFIC EMBODIMENTS

Figure 1:
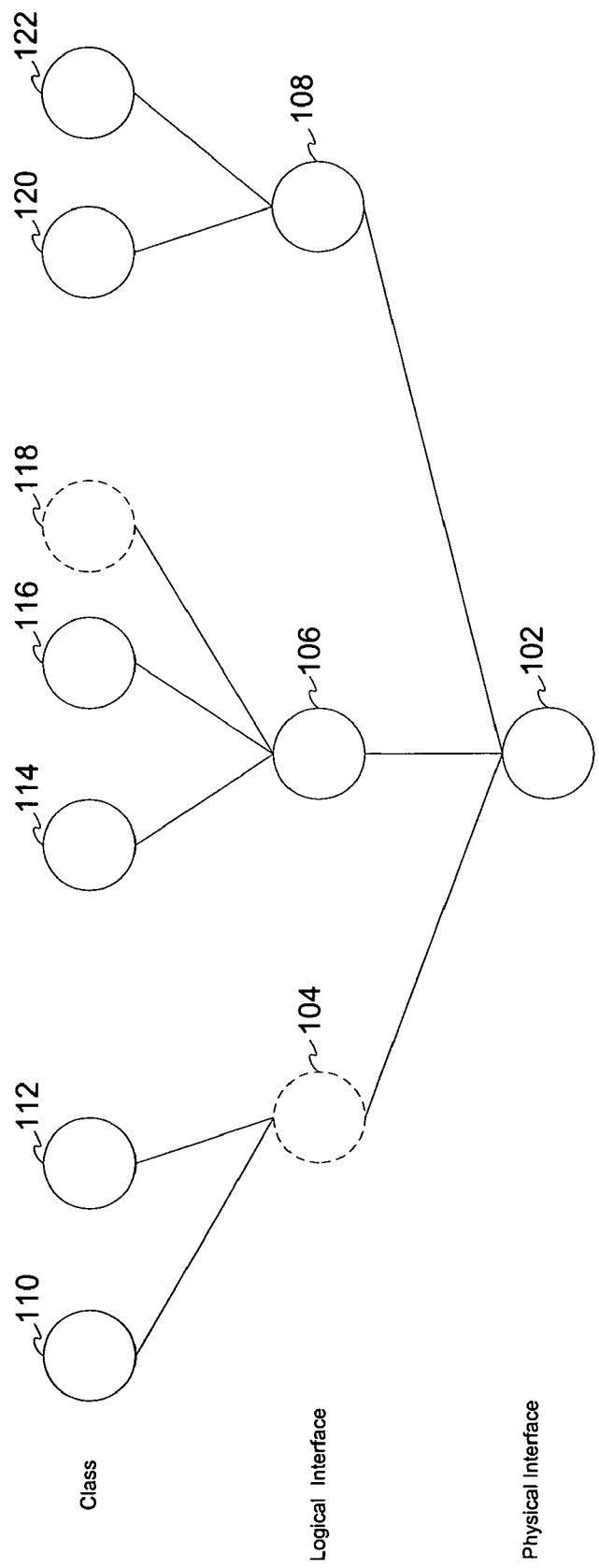
FIG. 1 depicts a tree that represents a class hierarchy and a scheduling hierarchy.

The present invention will be described with reference to a particular example as it applies to the scheduling hierarchy of FIG. 1. In FIG. 1, there are three layers of hierarchy and two levels of priority. The present invention is, however, not limited to any particular number of hierarchy levels or number of priority levels.

Embodiments of the present invention transform the scheduling hierarchy so that it no longer matches the class hierarchy. In this way priority propagation is provided that meets all of the requirements listed above. The transformation in the scheduling hierarchy can occur at configuration time.

The transformation begins with a class hierarchy like the one shown in FIG. 1. For the transformation to be effective, it is necessary (for the specific embodiments described herein) that there should be no more than one priority node in any path from a leaf node to the root.

In step (1), nodes of the class hierarchy tree are colored:

a) All priority nodes are colored black.

b) For each black node, all the nodes in traversal from this black node to the root are colored red. All nodes in any sub-tree of the black node are colored white.

c) For any other path from the root where there is no priority node, all the nodes are colored red.

Figure 2:
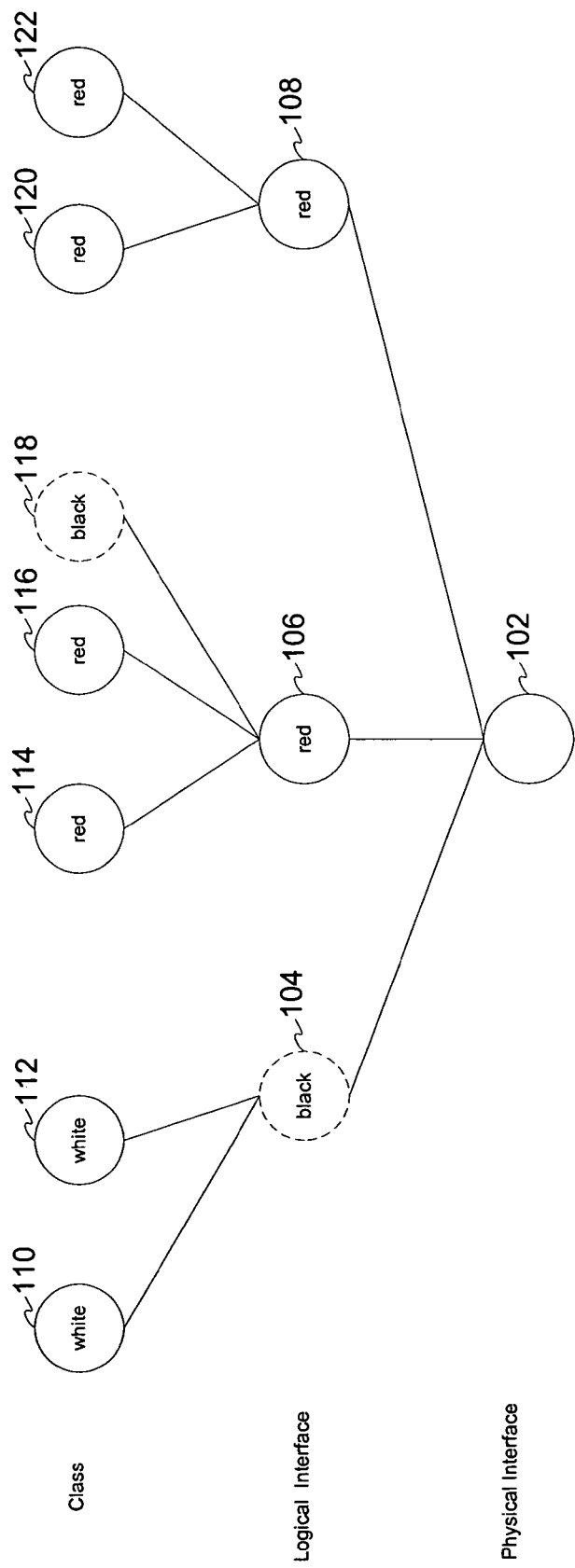
FIG. 2 depicts a first step in transforming the hierarchy of FIG. 1 to more optimally handle priority traffic according to one embodiment of the present invention.

FIG. 2 shows the results of performing this first step of transformation on FIG. 1. Nodes 106, 114, 116, 108, 120, and 122 are colored red. Nodes 110 and 112 are colored white. Nodes 104 and 118 are colored black.

The second step in the transformation is to separate out the black (priority) nodes into a separate sub-tree. The class hierarchy is transformed as follows:

a) The black nodes are picked up along with any white sub-trees rooted at them and dragged aside next to each other to the left of the initial tree. There is now an entirely red sub-tree on the right and an array of black nodes on the left with possibly one or more white sub-trees.

b) Two new nodes are created, P (priority) and O (other) as direct children of the root node.

c) All black nodes are made children of P.

d) The red tree is attached to O. P and O also operate schedulers and maintain schedule entries for their children nodes.

e) Pointers are provided from the black nodes of left sub-tree to their former parents in the unified class hierarchy that are now on the right sub-tree. If the former parent was the root node, the pointer instead goes to the O node.

Figure 3:
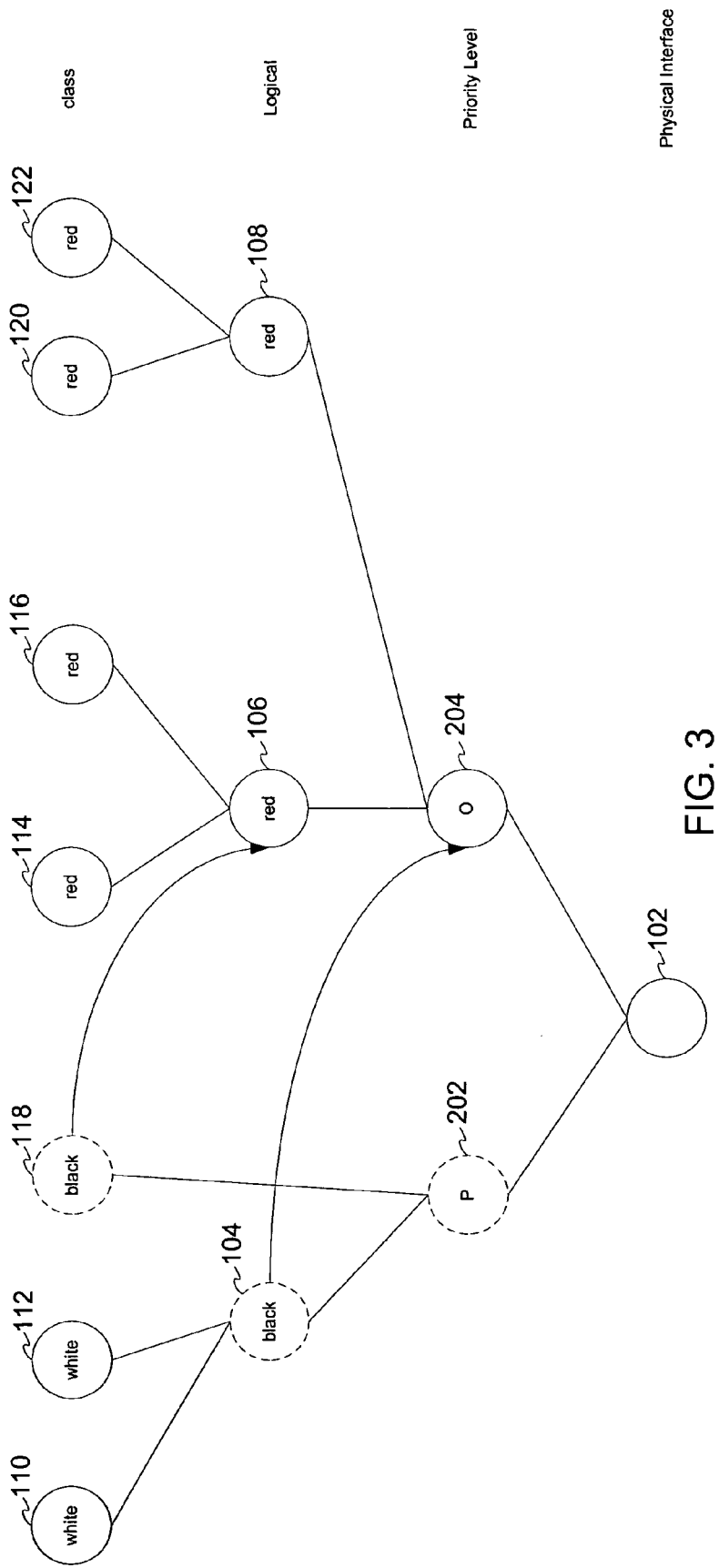
FIG. 3 depicts a second step in transforming the hierarchy of FIG. 1 according to one embodiment of the present invention.

FIG. 3 depicts the completed transformation according to one embodiment of the present invention. Nodes 110, 112, 118, and 104 belong to the priority sub-tree and hang from node P 202. Node 118 now has a sideways pointer to its former parent in the class hierarchy of FIG. 1, node 106. Node 104 has a similar sideways pointer to node O 204.

The above procedure assumes only a single level of priority for priority traffic. There could in fact be multiple such levels. This would be addressed by providing multiple priority sub-trees, each corresponding to a priority level. Pointers would then extend from all of the priority sub-trees to the single non-priority sub-tree.

Figure 4:
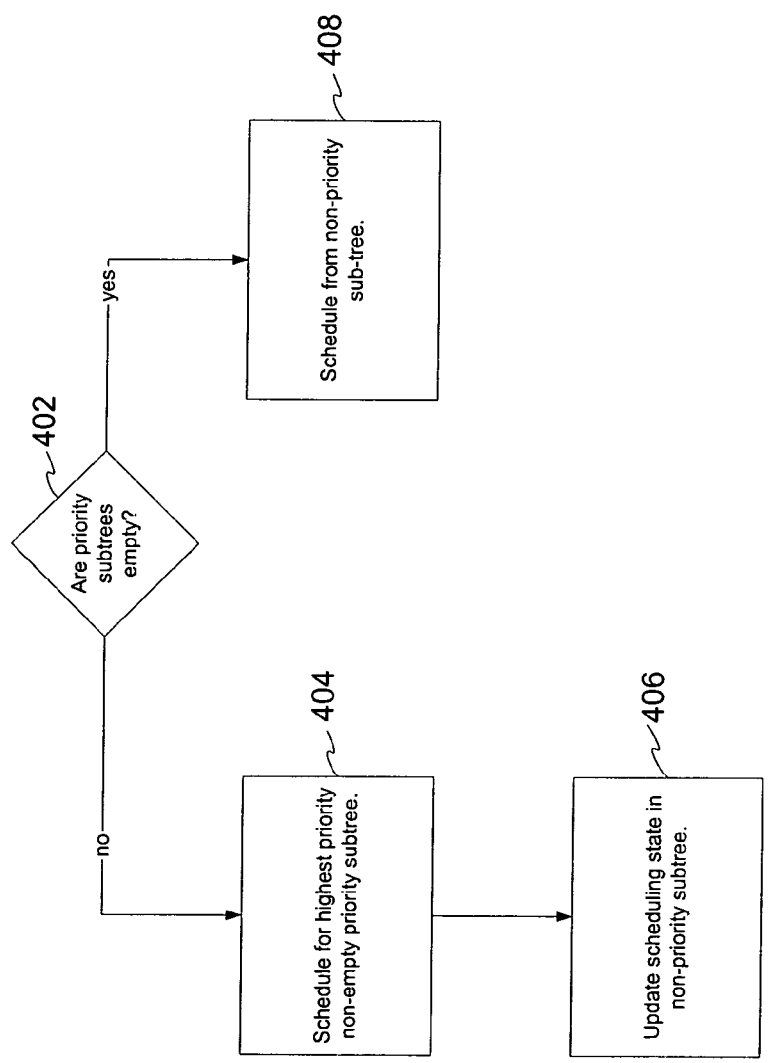
FIG. 4 is a flow chart describing steps of scheduling traffic according to one embodiment of the present invention.

Scheduling operation will now be described with reference to the sub-tree structure of FIG. 3. FIG. 4 is a flow chart describing steps of scheduling according to one embodiment of the present invention. At step 402 tests whether the queues of the priority sub-tree are empty. If there are multiple priority sub-trees, step 402 tests whether all of them are empty.

If the single priority sub-tree or all of the multiple priority sub-trees are non-empty, then step 404 is reached. Step 404 performs a scheduling operation on the one or more priority sub-trees. If there is a single priority sub-tree, that one is selected for scheduling. If there are multiple priority sub-trees, then the non-empty priority sub-tree with the highest priority level is scheduled. Thus the root node effectively chooses the appropriate node P for scheduling.

Scheduling by node P in the selected priority sub-tree operates in accordance with a rate-based scheduling technique along the lines described above, based on the rates configured for priority nodes in the original class hierarchy.

The implementation may be either pipelined or non-pipelined. The node P selects from among multiple black children nodes based on their configured priority rates. The node P will seek to allocate bandwidth in proportion to these priority rates. Where a black node schedules from among multiple white children nodes, it selects based on the configured minimum, maximum, and excess rates of the white nodes. Also, there is no need to employ priority propagation since all packets handled by the P node are priority traffic.

If all of the priority sub-trees are empty then a packet is scheduled from the non-priority sub-tree at step 406. The root thus selects from node O. Node O selects from its children nodes by employing a rate-based scheduling technique that takes into account maximum rate, minimum rate, and excess traffic sharing weight. The selected child node does the same. Again, either a pipelined scheme or a non-pipelined scheme may be employed.

When a priority node is selected by the scheduling algorithm, the ancestor nodes of the selected priority nodes in the original unified class hierarchy should be debited in some way for the transmitted traffic. Otherwise, these ancestor nodes will overconsume transmission capacity. Accordingly, following step 404, at step 408, the scheduling state of the non-priority sub-tree is updated to reflect transmission of a priority packet.

The exact form of the scheduling state that is updated will depend on the particular rate-based scheduler algorithm. For example, in one class of implementations, there are three keys for each scheduling entry: a minimum key (min_key), a maximum key (max_key), and an excess key (excess_key). The keys form a part of the entry maintained at the parent node. Rate-based scheduling provides that when a node has its packet of length packet_length selected for transmission (or promotion in the pipelined case) these keys are updated as follows:

min_key=min_key+packet_length/min_rate(configured minimum rate)

max_key=max_key+packet_length/max_rate(configured maximum rate)

excess_key=excess_key+packet_length/excess_weight (configured excess weight)

In one embodiment of the present invention, each node in the non-priority sub-tree that is the target of a sideways pointer from a priority sub-tree maintains a "priority_bits_gone" counter to track activity at the origin priority node of the pointer. The counter may also be understood to be a part of a schedule entry maintained by the parent of the pointer target. When the origin priority node is selected by node P for transmission or promotion of a packet, the counter is incremented by the length of the transmitted packet. Then when the pointer target node in the non-priority sub-tree next transmits or promotes a packet this counter is cleared and its value is added to the packet_length value before the keys are updated. It will be appreciated that alternative rate scheduling algorithms may use packet length in different ways in developing schedule state but embodiments of the present invention will provide for incorporating the lengths of the relevant priority packets in establishing the packet length value. The addition to the packet length value is also used to similarly update scheduling state at the pointer target node's non-priority ancestors down to the O node.

Since packets from the priority sub-trees are always selected when available, a policing function is preferably employed at the inputs to the priority queues. The policing function prevents the priority traffic from swamping the non-priority packets.

In a number of cases, however, it may be beneficial to update the "priority bits gone" counter at the time of arrival of the priority packet. Note that since the O tree will be scheduled before all priority packets leave the system, this update at the priority packet arrival time will not have any effect until the priority packet departs anyway.

The above-described techniques have many advantages. The black priority nodes are typically never delayed by red non-priority nodes except for the case of a non-priority packet that is currently being transmitted. The use of priority rates in selecting among priority nodes allows available bandwidth to be properly distributed among multiple priority flows and avoids a problem that is often encountered where one high data rate priority flow crowds out many smaller priority flows. The white descendents of priority nodes appropriately share whatever service that is allocated to their priority ancestor. Priority transmissions are properly accounted for within the non-priority sub-tree so that appropriate minimum and maximum bandwidth allocations are met. Furthermore, once the sub-trees have been configured, there is very little added complexity in the operation of the rate-based scheduler.

Figure 5:
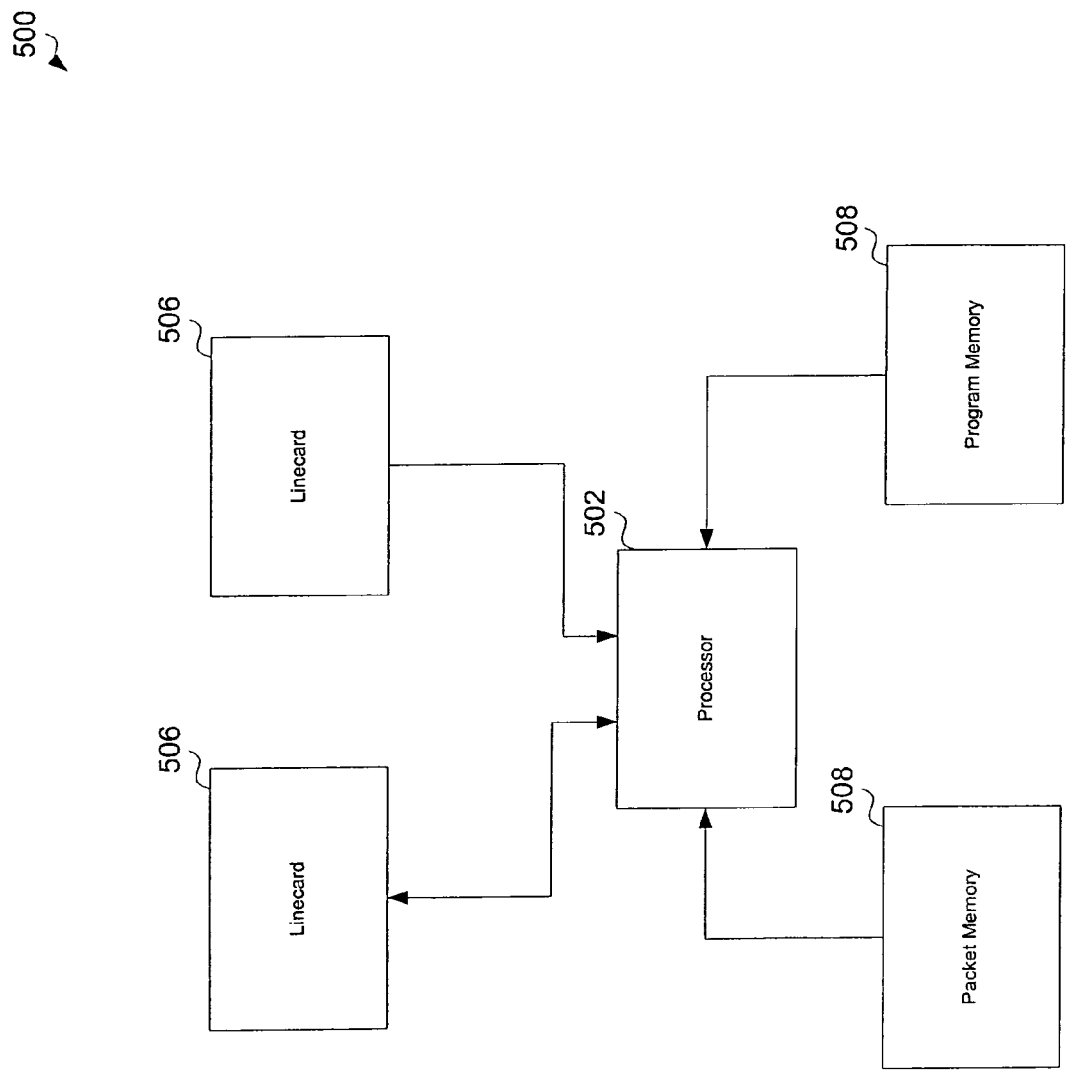
FIG. 5 depicts a network device useful in implementing embodiments of the present invention.

FIG. 5 depicts a network device 500 that may be used to implement a network device that operates the hierarchies shown in FIGS. 1-3 and the scheduling technique of FIG. 4. In one embodiment, network device 500 is a programmable machine that may be implemented in hardware, software or any combination thereof. A processor 502 executes code stored in a program memory 504. Program memory 504 is one example of a computer-readable medium. Program memory 504 can be a volatile memory. Another form of computer-readable medium storing the same codes would be some type of non-volatile storage such as floppy disks, CD-ROMs, DVD-ROMs, hard disks, flash memory, etc. A carrier wave that carries the code across a network is another example of a computer-readable medium.

Network device 500 interfaces with physical media via a plurality of linecards 506. Linecards 506 may incorporate Ethernet interfaces, DSL interfaces, Gigabit Ethernet interfaces, 10-Gigabit Ethernet interfaces, SONET interfaces, etc. As packets are received, processed, and forwarded by network device 500, they may be stored in a packet memory 508. Network device 500 implements all of the scheduling features provided by the present invention.

Packet transmission operations may occur partially or completely within one of linecards 506. To implement functionality according to the present invention, linecards 506 may incorporate processing and memory resources similar to those discussed above in connection with the network device as a whole.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A scheduling method for a multi-level class hierarchy wherein classes are represented as nodes in a unified tree, said method comprising:
   creating a new non-priority node and one or more new priority nodes in said unified tree;
   selecting non-priority nodes of said unified tree to establish a non-priority sub-tree, wherein said selected non-priority nodes are children of said new non-priority node in said non-priority sub-tree, as viewed in said multi-level class hierarchy;

selecting priority nodes of said unified tree to establish one or more priority sub-trees corresponding to one or more priority levels, wherein said selected priority nodes are children of said one or more new priority nodes in said one or more priority sub-trees, as viewed in said multi-level class hierarchy;

if and only if queues of nodes of said priority sub-trees are empty, applying a first scheduling algorithm to said non-priority sub-tree to select a packet for transmission; and if any of said one or more priority sub-trees are non-empty, selecting a priority packet from said one or more priority sub-trees for transmission.

2. The scheduling method of claim 1 wherein selecting a packet from said one or more priority sub-trees for transmission comprises:

selecting a highest priority non-empty sub-tree from said one or more priority sub-trees; and applying a second scheduling algorithm to said highest priority non-empty sub-tree to select a priority packet for transmission.

3. The scheduling method of claim 2 further comprising: updating scheduling state within said non-priority sub-tree to reflect transmission of said priority packet.

4. The scheduling method of claim 3 wherein updating comprises:

identifying a node within said non-priority sub-tree that has a parent relationship, as viewed in said multi-level class hierarchy, to a node within said priority sub-tree associated with said priority packet selected for transmission; and updating a scheduling state of said identified node and ancestor nodes of said identified node within said non-priority sub-tree.

5. The scheduling method of claim 4 wherein identifying comprises:

employing a pointer to said identified node.

6. The scheduling method of claim 4 wherein updating said scheduling state comprises:

adding a length of said selected priority packet to a length of a next transmitted packet associated with said identified node to be used in making further scheduling decisions within said non-priority sub-tree.

7. A computer-readable storage medium storing computer-executable code for scheduling a multi-level class hierarchy wherein classes are represented as nodes in a unified tree, said code comprising:

code that creates a new non-priority node and one or more new priority nodes in said unified tree code that causes selection of non-priority nodes of said unified tree to establish a non-priority sub-tree, wherein said selected non-priority nodes are children of said new non-priority node in said non-priority sub-tree, as viewed in said multi-level class hierarchy;

code that causes selection of priority nodes of said unified tree to establish one or more priority sub-trees corresponding to one or more priority levels, wherein said selected priority nodes are children of said one or more new priority nodes in said one or more priority sub-tress, as viewed in said multi-level class hierarchy;

code that, if and only if queues of nodes of said priority sub-trees are empty, causes application of a first scheduling algorithm to said non-priority sub-tree to select a packet for transmission; and code that, if any of said one or more priority sub-trees are non-empty, causes selection of a priority packet from said one or more priority sub-trees for transmission.

8. The computer-readable storage medium of claim 7 wherein said code that causes selection of a packet from said one or more priority sub-trees for transmission comprises:

code that causes selection of a highest priority non-empty sub-tree from said one or more priority sub-trees; and code that causes application of a second scheduling algorithm to said highest priority non-empty sub-tree to select a priority packet for transmission.

9. The computer-readable storage medium of claim 8 further comprising:

code that causes updating of scheduling state within said non-priority sub-tree to reflect transmission of said priority packet.

10. The computer-readable storage medium of claim 9 wherein said code that causes updating comprises:

code that causes identification of a node within said non-priority sub-tree that has a parent relationship, as viewed in said multi-level class hierarchy, to a node within said selected priority sub-tree associated with said transmitted priority packet; and code that causes updating of scheduling state of said identified node and ancestor nodes of said identified node within said non-priority sub-tree.

11. The computer-readable storage medium of claim 10 wherein said code that causes identification comprises:

code that causes employment of a pointer to said identified node.

12. The computer-readable storage medium of claim 10 wherein said code that causes updating of said scheduling state comprises:

code that causes addition of a length of said selected priority packet to a length of a next transmitted packet associated with said identified node to be used in making further scheduling decisions within said non-priority sub-tree.

13. Apparatus for scheduling a multi-level class hierarchy wherein classes are represented as nodes in a unified tree, said apparatus comprising:

a processor; and a computer-readable storage medium storing computer-executable code for execution by said processor, said code comprising;

code that creates a new non-priority node and one or more new priority nodes in said unified tree;

code that causes selection of non-priority nodes of said unified tree to establish a non-priority sub-tree, wherein said selected non-priority nodes are children of said new non-priority node in said non-priority sub-tree, as viewed in said multi-level class hierarchy;

code that causes selection of priority nodes of said unified tree to establish one or more priority sub-trees corresponding to one or more priority levels, wherein said selected priority nodes are children of said one or more new priority nodes in said one or more priority sub-tress, as viewed in said multi-level class hierarchy;

code that, if and only if queues of nodes of said priority sub-trees are empty, causes application of a first scheduling algorithm to said non-priority sub-tree to select a packet for transmission; and code that, if any of said one or more priority sub-trees are non-empty, causes selection of a priority packet from said one or more priority sub-trees for transmission.

14. The apparatus of claim 13 wherein said code that causes selection of a packet from said one or more priority sub-trees for transmission comprises:
  code that causes selection of a highest priority non-empty sub-tree from said one or more priority sub-trees; and
  code that causes application of a second scheduling algorithm to said highest priority non-empty sub-tree to select a priority packet for transmission.

15. The apparatus of claim 14 wherein said instructions further comprise:
  code that causes updating of scheduling state within said non-priority sub-tree to reflect transmission of said priority packet.

16. The apparatus of claim 15 wherein said code that causes updating comprises:
  code that causes identification of a node within said non-priority sub-tree that has a parent relationship, as viewed in said multi-level class hierarchy, to a node within said priority sub-tree associated with said priority packet selected for transmission; and
  code that causes updating of scheduling state of said identified node and ancestor nodes of said identified node within said non-priority sub-tree.

17. The product of claim 16 wherein said code that causes identification comprises:
  code that causes employment of a pointer to said identified node.

18. The apparatus of claim 16 wherein said code that causes updating of said scheduling state comprises:
  code that causes addition of a length of said selected priority packet to a length of a next transmitted packet associated with said identified node to be used in making further scheduling decisions within said non-priority sub-tree.

19. Apparatus for scheduling a multi-level class hierarchy wherein classes are represented as nodes in a unified tree, said apparatus comprising:
  means for creating a new non-priority node and one or more new priority nodes in said unified tree;
  means for selecting non-priority nodes of said unified tree to establish a non-priority sub-tree, wherein said selected non-priority nodes are children of said new non-priority node in said non-priority sub-tree, as viewed in said multi-level class hierarchy;
  means for selecting priority nodes of said unified tree to establish one or more priority sub-trees corresponding to one or more priority levels, wherein said selected priority nodes are children of said one or more new priority nodes in said one or more priority sub-trees, as viewed in said multi-level class hierarchy;
  means for, if and only if queues of nodes of said priority sub-trees are empty, applying a first scheduling algorithm to said non-priority sub-tree to select a packet for transmission; and
  means for, if any of said one or more priority sub-trees are non-empty, selecting a priority packet from said one or more priority sub-trees for transmission.

* * * * *